July 12, 1966  F. D. WERNER  3,260,102
CALIBRATION METHOD AND DEVICE FOR HEAT FLUX SENSORS
Filed Dec. 11, 1963  3 Sheets-Sheet 1

INVENTOR.
FRANK D. WERNER
BY
Dugger, Braddock, Johnson & Westman
ATTORNEYS

July 12, 1966    F. D. WERNER    3,260,102
CALIBRATION METHOD AND DEVICE FOR HEAT FLUX SENSORS
Filed Dec. 11, 1963    3 Sheets-Sheet 3

INVENTOR.
FRANK D. WERNER
BY
Dugger, Braddock, Johnson & Westman
ATTORNEYS 3,260,102
CALIBRATION METHOD AND DEVICE FOR HEAT
FLUX SENSORS
Frank D. Werner, Minneapolis, Minn., assignor to Rosemount Engineering Company, Minneapolis, Minn., a corporation of Minnesota
Filed Dec. 11, 1963, Ser. No. 329,773
9 Claims. (Cl. 73—1)

The invention relates to method and apparatus for calibrating heat flux sensors. The term "heat flux" may be defined as: "rate of heat flow." In many situations in the technical arts, where heat flows are being considered, it is desirable to provide instrumentation for determining the rate of heat flow in the particular environmental conditions under consideration. There are many and various devices known as "heat flux sensors." All such devices, for proper utilization, must be calibrated so that the output signal, usually an electrical signal, will indicate the rate of heat flow received by or passed through the sensors.

It is an object of the present invention to provide improved method and apparatus for testing and calibrating heat flux sensors. It is a further object of the invention to provide an electron beam device and method for calibrating heat flux sensors. It is another object of the invention to provide electron beam device wherein an electron beam may be impinged upon the heat receiving surface of a heat flux sensor, and said beam, constituting an electric current, is then conducted away, and the amount of power represented by such electrical current is measured as an indication of the amount of heat flow onto the surface of the sensor, for testing and calibration purposes.

It is a further object of the invention to provide an improved method and apparatus for testing heat flux sensors having electrically conductive heat receiving surfaces by impinging thereon an electron beam and simultaneously measuring the beam power and the signal output of the sensor. It is another object of the invention to provide in the foregoing method and apparatus means for preventing radiated heat from leaving the sensor during its testing and calibration.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein.

Throughout the drawings, the same numerals refer to the corresponding parts.

Figure 1:
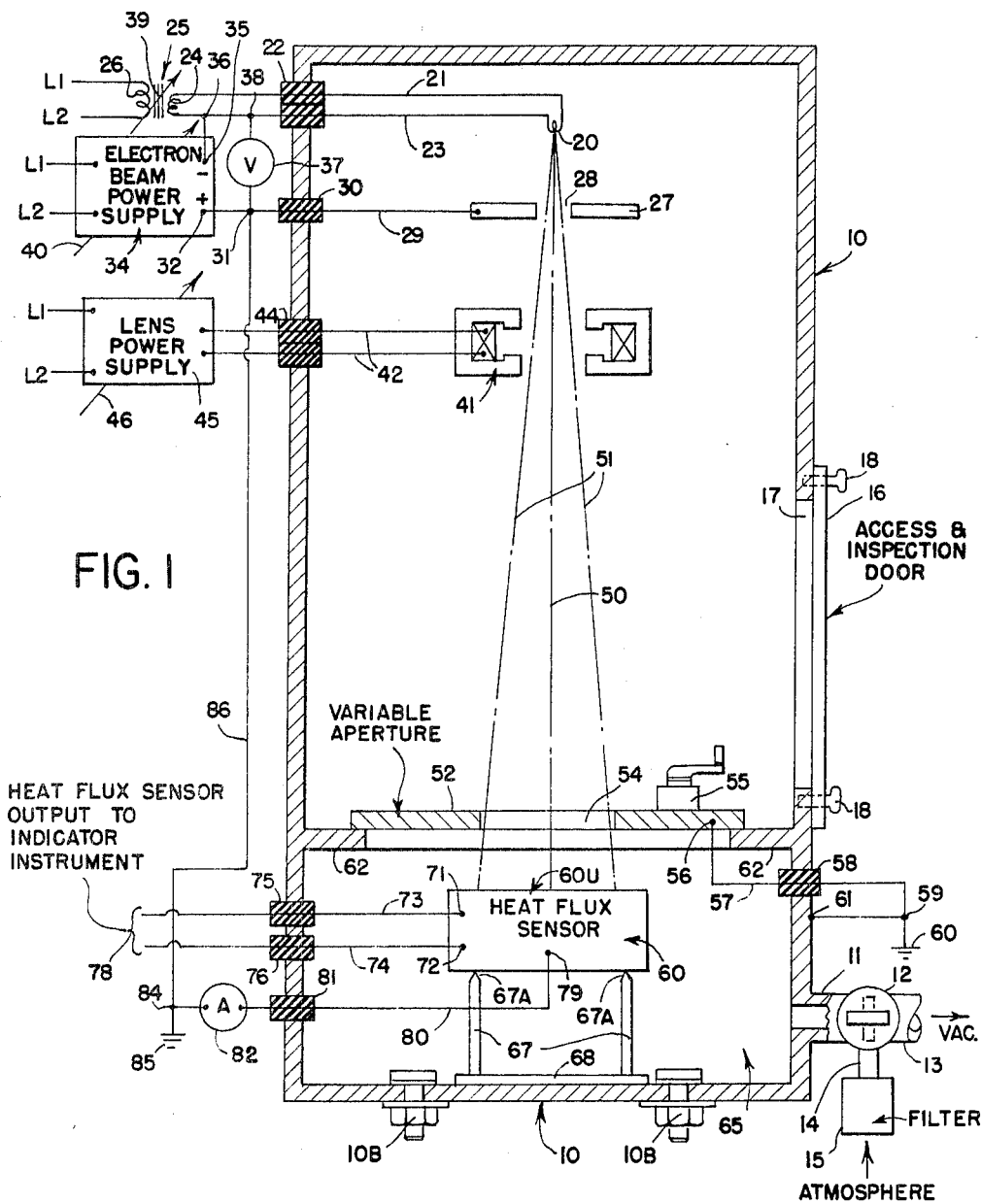
FIGURE 1 is a schematic vertical sectional view through an electron beam device of the present invention, and wherein the method is illustrated.

The method of the present invention is illustrated with reference to the drawings.

According to the method of the present invention, the heat flux sensor to be tested and/or calibrated is supported in an electron beam apparatus in a position such that the electrically conductive heat receiving surface of the heat flux sensor is in a position such that the electron beam is impinged thereon. The product of current constituting the electron beam and the accelerating voltage, i.e. the wattage of the beam, is measured simultaneously with the output signal of the heat flux sensor. The electron beam wattage is a measurement of the power flowing into the surface of the sensor and this is then a measure of the flow of heat impinging upon the surface of the sensor. Accordingly, the amount of heat falling upon the heat receiving surface of the heat flux sensor is known simultaneously with the signal output of the sensor. It it is desired to calibrate the heat flux sensor for a full range of heat flows, the power of the electron beam is then varied throughout a range of power settings, and at each power setting, the power of the electron beam and the signal output of the heat flux sensor are read simultaneously. The heat flux sensor output signal can then be calibrated in terms of heat flow, which is the end result desired.

If desired, the beam power may be varied automatically, by utilizing a programming apparatus (not shown) and this can be done at high speeds, the read-out of the sensor being simultaneously recorded. In this way, for the first time, very rapid and fast changing, accurately known heat flow rate changes may be calibrated.

In some situations calibration may be accomplished without conducting heat away from the heat flux sensor, the temperature of which is permitted to rise during the period of calibration. Under such conditions the heat loss from the heat flux sensor, during calibration, should be minimized, and therefore, according to the present invention, provision is made for supporting the heat flux sensor in such a manner so as to minimize heat outflow therefrom either by conduction or radiation. It is within the purview of the invention to support the heat flux sensor so that a minimum of heat loss occurs during the calibration thereof. When calibrating the sensor, without conducting the heat away from the sensor, the heat of the electron beam will manifest itself as a continuous increase of the temperature of the sensor during the period of calibration, and for this purpose a temperature indicator may be utilized in the sensor to provide the signal output therefor.

In other situations, in utilizing the present invention the heat flux sensor is mounted in heat communication with a heat sink, which may be maintained at a constant temperature throughout the time of calibration by conducting a flow of heat-transmitting fluid therethrough. In such a calibration, the temperature of the sensor will increase on that side of the sensor which receives the electron beam, but on an opposite face (or faces) heat will flow away and the average temperature of the sensor will therefore not increase during the time of calibration.

In some instances, in carrying out the invention, it is desirable to provide an aperture of fixed or variable area for defining the cross-sectional shape and size of the electron beam falling upon the heat receiving surface of the sensor.

Referring to the drawings, FIGURE 1 illustrates an electron beam apparatus for the present invention wherein the container generally designated 10 is provided with a vacuum connection at 11 having a valve 12 and a vacuum source connection 13. The valve is also connected via the pipe 14 and filter 15 to atmosphere. When the valve is in a full line position shown in FIGURE 1, the pipe 13 is connected to the chamber 10, for evacuating the chamber and in this condition the connection 14 to atmosphere is closed off. When it is desired to reestablish atmospheric pressure within the chamber, the valve is turned to its dotted line position which closes off the vacuum line 13 and opens the line 14, the atmospheric air then passes through the filter 15, line 14, valve 12 and line 11 and enters the chamber 10, thereby re-establishing atmospheric pressure in the chamber.

The chamber 10 is provided with a removable access door 16 which can be clamped in vacuum-tight relation to the access opening 17 by means of the holding screws 18—18. When the door 16 is removed, access may be had into the interior of the chamber 10 for inserting or removing the various devices removably positioned therein.

At the upper end of the chamber there is provided a cathode emitter 20 usually in the form of a filament cathode supplied by the power lines 21 and 23 which passes through the insulated vacuum tight seal 22 and extends to the secondary 24 of the transformer 25 having a primary 26 supplied from lines L1 and L2. Line 23 has junctions 36 and 38 thereon. The filament voltage can be varied by control 29 on transformer 25, or a variable resistance (not shown) may be used for determining the filament temperature (and hence the rate of electron emission). The electron beam device also includes one or more beam acceleration plates 27 having aperture 28 therein. This plate 27 (or plates) is provided with an electrical connection 29 leading through the vacuum tight electrical insulator 30 and through junction 31 to the positive terminal 32 of an electron beam power supply generally designated 34 that is supplied with electrical power from lines L1 and L2. This power supply has a negative terminal 35 connected to junction 36 on lines 23 of the filament circuit of the beam generator. A volt meter 37 is connected from junction 32 to junction 38 on the beam cathode filament circuit and indicates the beam acceleration voltage. The beam voltage supply 34 is made variable by control 40 and the cathode circuit is variable by means of the adjustment 39. Within the chamber 10 there is a magnetic lens generally designated 41, supplied by the circuit 42 through the insulator 44 from the lens power supply 45 which is supplied with power from lines L1 and L2, said lens power supply being adjustable by means of the regulator 46. By adjusting the amount of electron emission at the cathode 20 by means of the adjustment 39, and by adjusting the acceleration potential V by varying the voltage of the electron beam power supply via adjustment 40, any desired strength and acceleration of electron beam i.e. power of electron beam may be achieved, within the range of the apparatus. By adjusting the lens power supply 46 the spread of this electron beam can be varied within wide limits.

The electron beam is illustrated as between the lines 51—51 and as having a centerline 50. In the illustrated embodiment of the invention the beam passes downwardly through the chamber 10 and through an aperture plate 52 which is provided with an aperture 54 the size and shape of which may be fixed or variable by means of the adjustment 55. In some instances, the aperture plate 52 can be entirely eliminated, and the focusing and location of the electron beam adjusted so that all of the beam falls upon the heat receiving surface of the sensor undergoing calibration. In other instances, and according to the preferred embodiment of the invention, the electron beam 50—51 is passed through an aperture 54, and its area is thereby accurately controlled.

The aperture plate 52 has a connection 56 and it is connected via line 57 through the insulating vacuum tight seal 58 to ground junction 59 and thence to ground 60. The circuit extends also from junction 59 to a connection 61 on the container 10 as when the container 10 is of electrically conductive materials.

The aperture plate is supported by interior flanges 62—62. Below the aperture plate there is a bottom chamber generally designated 65, in which the heat flux sensor 60, undergoing calibration, or testing is supported. For inserting the heat flux sensor, the aperture plate 52, where used, is lifted and the heat flux sensor generally designated 66 is then inserted and supported on a suitable support, which can be varied according to the type of sensor being tested and the procedure of the tests. In FIGURE 1, the support consists of posts 67—67 on a plate 68. These posts are preferably made of heat insulating material or may have a heat insulating section therein, and they are preferably pointed at their upper ends 67A—67A so as to minimize the area of contact with the underside of the sensor 60. The particular sensor 60 may have one or more signal output terminals or leads. In FIGURE 1 the signal output is at terminals 71 and 72 via lines 73 and 74 through insulating seals 75 and 76 to the heat sensor output indicator instrument, not illustrated, indicated by the brackets 78.

The present invention is suitable for calibrating only those types of heat sensors which have an electrically conductive heat-receiving surface or a heat-receiving surface which can be made electrically conductive for the purposes of the test. Accordingly the sensor 60 is illustrated as having a terminal 79 from which a circuit 80 extends through the seal 81 and ammeter 82 to ground terminal 84 and thence to ground 85. The circuit also extends from the ground terminal 84 over line 86 to the terminal 31 on line 29. It is understood that the upper surface 60U of the sensor 60 receives the heat input and is electrically conductive and that the terminal 79 is conductively connected to such circuit surface 60U.

Accordingly, the beam 50–51 falling upon the surface 60U, or a portion of such surface, constitutes an electrical current which is collected and conducted via terminal 79 and line 80 through ammeter 82, where its strength is measured, and thence to ground terminal 84 and thence via the line 86 back to the cathode circuit 21 and cathode 20. This electrical current is composed of electrons which have moved through a voltage differential supplied by the electron beam power supply, the voltage of which is indicated by the voltmeter 37 and these electrons impinge upon the surface of the heat flux sensor. The electron beam power is accordingly the product of the voltage V (meter 37) and current A (meter 82).

Assuming there are no collisions between electrons in going from the cathode to the heat flux sensor and if no electrons which impinge on the sensor are re-emitted, it then follows that the power received by the heat flux sensor is exactly equal to the beam power, as indicated by the ammeter 82 and the voltmeter 37. There may be one minor additional correction, because electrons are given a slight amount of energy due to the high temperature of the cathode. Unless the power supply voltage is very low, this energy, supplied by the high temperature of the cathode, is negligible by comparison to the energy supplied by the accelerating voltage V, indicated by the voltmeter 27. Thus, power supply voltages of the order of a few thousand volts or more will render negligible the amount of energy imparted to the electrons due merely to the temperature of the cathode. Electron collisions in the space between the cathode and the heat flux sensor will therefore ordinarily be only collisions with residual gas in the vacuum and since vacuum supply is provided, such collisions of electrons with residual gas can also be made substantially negligible. Since the area of the aperture plate is known and the beam power is measured as described, it then follows that the power per unit area has been measured and serves as a calibration measurement of heat input flux to the heat flux sensor.

It is desirable that the aperture 54 be as large as, or larger than, the sensitive area of the heat flux sensor, since some heat flux sensors may respond with an erroneous output if heat flux is applied only to a portion of the sensitive surface. The essential fact is that by making the aperture larger, it will still remain the area of the aperture and the measured power going through the aperture that will provide a measure of input (power per unit of area) and this is the essential input parameter for calibration of the heat flux sensor. It is desirable that the aperture be somewhat smaller than the electron beam, or the heat flux through the aperture will not be uniformly distributed. By the same token the energy density in the electron beam should be as uniform as can conveniently be achieved.

By the method of this invention, it is possible precisely to measure beam current, beam voltage and effective area. The amount of current and voltage are measured by the ammeter 82 and the voltmeter 37 respectively and can readily be adjusted over very wide limits. Thus, it is possible, by means of this invention, to calibrate heat flux rates or any intermediate rates. For example, using a typical electron beam welder as the source of a high power electron beam for utilization pursuant this invention, it is quite feasible to have power levels as high as ten kilowatts or more in the electron beam, and when this is focused on a relatively small heat flux sensor, it is possible, by use of this inveniton to obtain an extremely large heat flux rate. In addition to accuracy and ease of control and adjustment, another advantage of the invention exists which is most important, namely a transient heat flux input can be provided. For example, by suitable control of the adjustments 39, 40 and 46, variations in heat flux can easily be obtained on practically an instantaneous basis, thereby for the first time allowing for the testing of heat flux sensors on a rapid time-basis.

In FIGURE 1 (also FIGURE 2) two bolts 10B—10B are illustrated. These are merely vacuum-tight plugs for holes in closure surface 10L that are used in some modes of testing (see FIGURE 3).

Referring to FIGURES 4, 5, 6 and 7 there are illustrated several forms of heat flux sensors, which are merely illustrative of many forms of sensors which can be calibrated by utilizing the method and apparatus of this invention. Thus, in FIGURE 4, the sensor 90 may be assumed to have a conductive surface 90U, upon which the heat input is received or for testing and calibation pursuant this invention this surface is, or is made, electrically conductive and is connected to the electrical "ground" terminal 91 from which a circuit extends at 92 through ammeter 94 to junction 84. In the sensor 90, the thickness of material from the upper surface 90U to the lower surface 90L, and the inherent properties of such material, determines the rate at which heat will flow from the surface 90U to the surface 90L, and these surfaces will be at different temperatures during the time that heat impinges upon the surface 90U and the average temperature is rising. For measuring the temperature of these two surfaces there are provided thermo-couple junctions 95 on the upper surface 90U and 96 on the lower surface 90L. These thermo-couple junctions are made by the connection of metallic wires of different materials, thus the two leads 73 and 74 might be made of one material, such as iron, and the interconnecting lead 97 might be made of another material, such as constantan, or the two leads 73 and 74 might made of platinum and lead 97 of platinum-rhodium alloy. In any event, depending upon the range of temperatures desired, thermo-couple junctions are planted in the two surfaces 90U and 90L and they will accordingly measure the temperatures of these surfaces and provide signal indication forming the output of the sensor. The sensor 90 can be calibrated by resting it upon a thermo-insulation layer 98, and the temperature of the sensor will then be permitted to rise during the calibration tests. The different temperatures at its upper and lower surfaces respectively, being measured during the period of the temperature rise. Or if desired, such a heat flux sensor can be mounted with the lower surface 90L in thermocommunication with a heat sink, as will be hereinafter described so that the surface 90L would be maintained at a substantially constant temperature, and the heat inflow upon the upper surface 90U will thereby be steadily conducted away during the calibration test.

Figure 5:
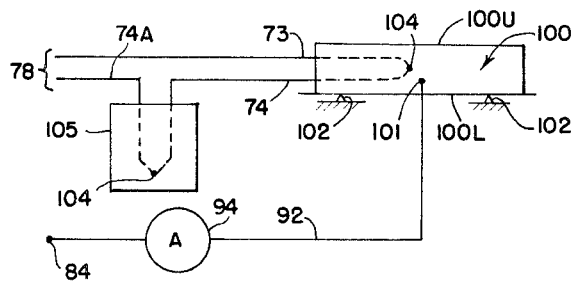

In FIGURE 5 there is illustrated another form of heat flux sensor 100 having an upper surface 100U and a lower surface 100L. It is again assumed that the upper surface 100U is electrically conductive and is connected either through the material or otherwise to an output (ground) terminal 101 which connects through the line 92 and ammeter 94 to the terminal 84. In FIGURE 5 the sensor 100 is illustrated as being supported upon two points 102—102 which are thermally substantially non-conductive. In this instance a thermo-couple 104 is planted within the body of the sensor and is connected by the leads 73 and 74 to the read-out circuit, but lead 74 is, in this illustration, interrupted so as to provide a "cold-junction" 104 which is maintained at a certain fixed ambient temperature by means of a cooling media in the container 105. In this illustration, the interconnecting lead 74 is of a material diverse from that of which leads 73 and 74A are composed.

Figure 6:
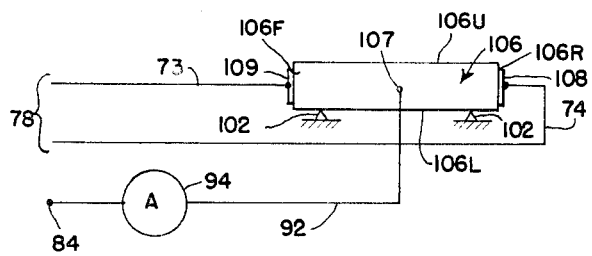

In FIGURE 6 there is illustrated another form of heat flux sensor 106 having an upper heat receiving surface 106U and a lower surface 106L, it being understood that the upper surface 106U is electrically conductive and is connected through the body of the sensor 106 to an output terminal 107 which extends via the line 92 through ammeter 94 to the terminal 84. The sensor is supported on points 102—102, as in FIGURE 5 and it is composed of such a material that when heat is received on a surface constituting one of its faces 106U and is not received upon an opposite face 106L, that a voltage will be generated between faces of the material which are at right angles (or at some other angle) to a line between the faces 106U and 106L. In this illustration, these other faces are 106R and 106F, and these faces have plated thereon (or otherwise attached) electrodes 108 and 109 respectively, which are respectively connected to the output lines 74 and 73, leading to the sensor signal indicating instrument.

Figure 7:
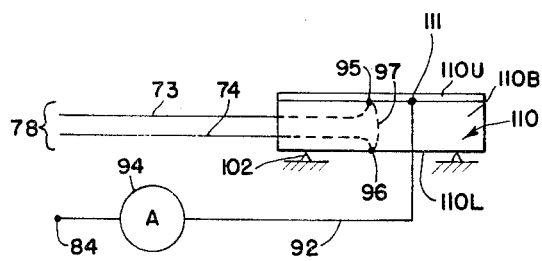

In FIGURE 7 there is illustrated a still different type of heat flux sensor 110 which has its main body 110B composed of an electrically non-conductive material, but upon the upper heat receiving surface there is deposited an electrically conductive layer 110U. The lower surface 110L is supported by the thermally non-conductive supports 102, as in FIGURE 5. The mode of indication is via lines 73 and 74 which lead to thermocouples 95 and 96 interconnected by the line 97, according to the description given with reference to FIGURE 4. A terminal 111 is provided on the electrically conductive heat receiving surface 110U and connects via line 92 and ammeter 94 to junction 84.

These are only a few of the varying forms of heat flux sensors which can be calibrated by utilizing the method and apparatus of the present invention. It will be understood that the mode of mounting may be varied, and the indicating instrument varied, depending upon the type of heat flux sensor being calibrated.

Figure 2:
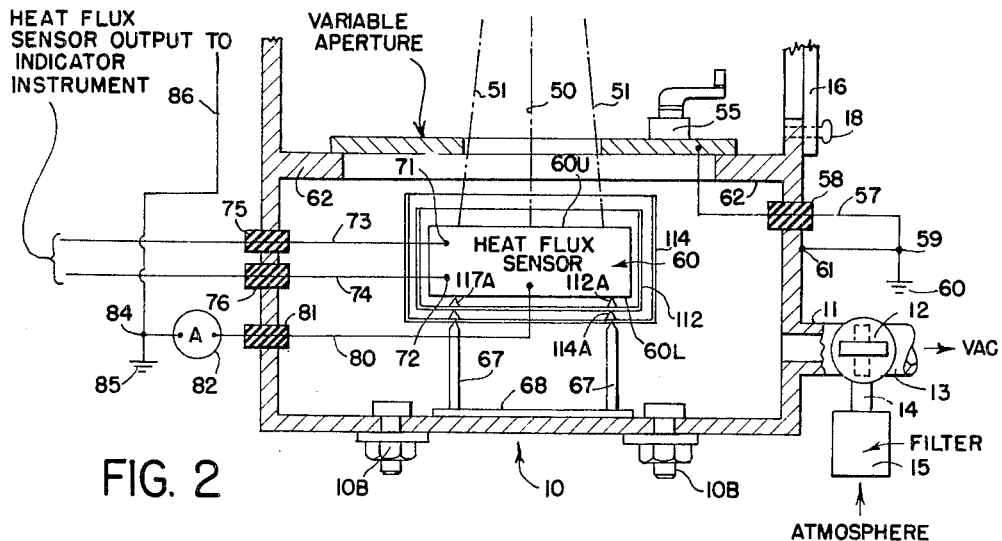
FIGURES 2 and 3 are each fragmentary vertical sectional views similar to the lower portion of FIGURE 1, each illustrating other embodiments of the method and apparatus of the present invention.

Referring now to FIGURE 2 there is illustrated a slightly modified form of the apparatus and method of the present invention wherein all portions thereof are identical with that illustrated in FIGURE 1 except that the heat flux sensor 60 is supported within one or more radiant heat shields 112 and 114 which are spaced from but closely encompass the heat flux sensor 60 on all of its sides except the upper surface 60U upon which the heat input is received. To accomplish this, the heat shields 112 and 114 are in the forms of boxes, each having upwardly reaching supports points in its bottom, the inner box 112 being provided with points 112A on its floor for supporting the sensor 60 elevated from the floor and box 114 having points 114A for supporting box 112. A single radiant head shield 112 may be used if desired, but several radiant heat shields are preferably used, each of slightly larger size. In any event each is provided on its floor with upwardly turned nibs as at 112A and 114A, so as to support the next thing above (shield or sensor). These heat shields are provided with apertures in their floors and walls so as to permit the sensor lead wires 73, 74 and 80 to pass out therethrough without grounding against the shields.

In use, the heat shield becomes heated due to the heat radiated from those sensor surfaces other than the upper surface 60U which is receiving radiant heat thereon. As soon as the innermost radiant heat shield, here illustrated as shield 112, reaches substantially the temperature of the proximate surfaces of sensor 60, it will re-radiate heat back to said surfaces, thereby compensating for the heat loss. In this way, the effective heat losses along the plane of the material for example will be minimized.

Figure 3:
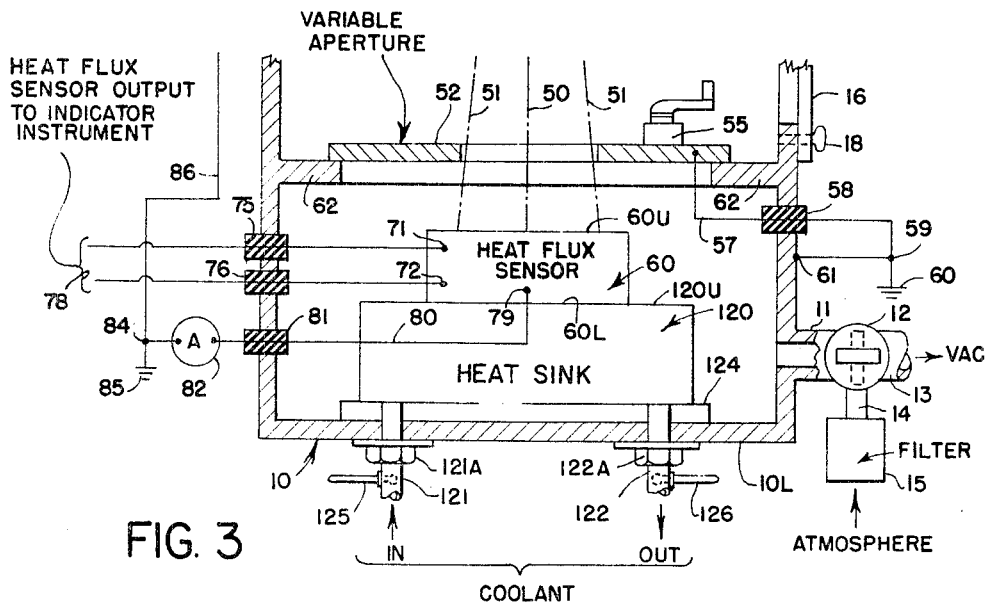
Figure 4:
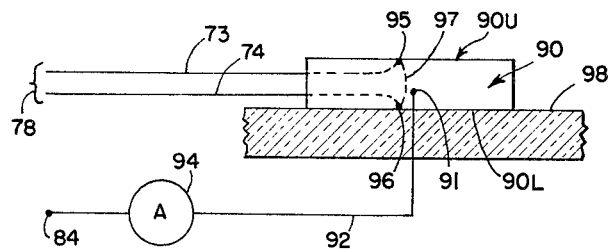
FIGURES 4, 5, 6 and 7 are side elevational view, partly schematic, illustrating exemplary forms of heat flux sensors.

In FIGURE 3, a slightly different embodiment of invention is illustrated. Again, this is identical with that shown in FIGURE 1, except that the heat flux sensor 60 is in this instance supported with its lower surface 60L in thermal communication with a heat sink 120, sink 120 is hollow, or is provided with a "cooling tubing" extending therethrough, for conducting a heat transfer fluid. The heat sink 120 is provided with an inlet pipe 121 and an outlet pipe 122 each of which extend through the lower wall 10L of the container at the holes previously plugged by bolts 10B—10B. See FIGURES 1 and 2. Each of these connection tubes 121 and 122 has a threaded section for receiving a gland nut as at 121A and 122A, the gland nut being seated upon a suitable washer for tightly sealing the inlet connection pipes to the wall 10L of the electron beam enclosure. Between the bottom of the heat sink 120 and the lower wall 10L of the electron beam enclosure there is provided a layer 124 of thermal insulating material, and the heat sink temperature is thereby not much subjected to gain or loss of heat due to the adjacent wall 10L. Each of the inlets 121 and outlet tube 122 is provided with a thermometer as at 125 and 126 respectively, and the difference in temperature between these thermometers and measurement of the quantity of fluid passed will therefore provide an indication of the amount of heat that is carried away from the heat sink.

Thus, in a calibration test during which a steady heat flow is received via the electron beam on the upper surface 60U of the heat flux sensor 60 heat will pass down through the sensor and through its lower surface 60L into the upper surface 120U of the heat sink and the heat flow into the heat sink will then be carried away by the flow of thermo-fluids entering through the tube 121 and leaving through the tube 122. The temperature in the inlet and outlet are read. Accordingly, the amount of heat flowing upon the sensor is determinable not only by the power of the beam (i.e. amperage at 82 and voltage at 37) as previously described, but is also determinable by the temperature of the inlet 121 and outlet 122 and the quantity of fluid flowing therethrough. One factor may thus be checked against the other for more calibration of the sensor.

As many widely apparently different embodiments of this invention may be made without departing from the spirit and scope thereof, it is to be understood that I do not limit myself to the specific embodiments disclosed herein.

What is claimed is:

1. The method of calibrating a heat flux sensor having a signal output circuit and an electrically conductive heat receiving surface which comprises impinging an electron beam upon said heat receiving surface, conducting away from said surface the electric current resulting from said electron beam and simultaneously measuring the power of said electric current for determining the heat input to said heat flux surface and the signal output of said sensor.

2. The method of claim 1 further characterized in passing the electron beam through an aperture of predetermined area adjacent the sensor, before impinging it upon the sensor.

3. The method of claim 1 further characterized in supporting the sensor out of heat conductive relationship in respect to surrounding objects, while the beam is impinged thereon.

4. The method of claim 1 further characterized in shielding those portions of the sensor, other than the surface upon which the beam is impinging, against radiated heat loss while the beam is impinging on the sensor.

5. The method of claim 1 further characterized in supporting the sensor in heat conductive relation to a heat sink while the beam is being impinged thereon.

6. The method of claim 5 further characterized in passing a heat transmitting fluid through the heat sink for maintaining the heat sink at a prescribed temperature while the beam is impinged on the sensor.

7. The method of claim 6 further characterized in measuring the temperature of the heat transmitting fluid as it enters and leaves the heat sink.

8. The apparatus for calibrating a heat flux sensor having a signal output circuit and an electrically conductive heat receiving surface, which comprises, an electron beam generator including an evacuatable chamber having a closable access opening therefore, a vacuum connection for said chamber for evacuating said chamber and electron beam means in said chamber for generating and projecting a beam of electrons along a prescribed path in the chamber, support means in said chamber for supporting a heat flux sensor in a position in the path of said beam for receiving the electron beam on its electrically conductive heat receiving surface, an output electrical circuit having a portion within the chamber connectable to the signal output circuit of the sensor for conducting away from said surface the electric current constituting said electron beam, and electric signal output power measuring means in said circuit, said apparatus being further characterized in that said support means includes a heat radiation shield around all portions of said sensor except the surface thereof upon which the electron beam is received.

9. The apparatus for calibrating a heat flux sensor having a signal output circuit and an electrically conductive heat receiving surface, which comprises, an electron beam generator including an evacuatable chamber having a closable access opening therefore, a vacuum connection for said chamber for evacuating said chamber and electron beam means in said chamber for generating and projecting a beam of electrons along a prescribed path in the chamber, support means in said chamber for supporting a heat flux sensor in a position in the path of said beam for receiving the electron beam on its electrically conductive heat receiving surface, an output electrical circuit having a portion within the chamber connectable to the signal output circuit of the sensor for conducting away from said surface the electric current constituting said electron beam, and electric signal output power measuring means in said circuit, the apparatus being further characterized in that said support means is a heat sink on which the sensor can be supported in heat communicating relationship, and fluid circuit means is provided extending from a position external to the chamber thence into the chamber, through the heat sink and thence out of the chamber for maintaining the sink at a prescribed temperature, and temperature measuring means are provided in said fluid circuit for measuring the temperature of the fluid flowing to and away from said sink.

References Cited by the Examiner

UNITED STATES PATENTS

| | | |
|---|---|---|
| 2,968,723 | 1/1961 | Steigerwald. |
| 2,981,823 | 4/1961 | Candiclus. |
| 3,118,050 | 1/1964 | Hetherington _____ 219—121 X |
| 3,146,335 | 8/1964 | Samuelson _____ 219—121 |

OTHER REFERENCES

Herzfeld Temperature, Its Measurement and Control in Science and Industry, vol. 3, Part 2, Applied Methods and Instruments, ed. by Dohl., Reinhold Pub. Co., New York, 1962, pages 667, 668 of interest.

LOUIS R. PRINCE, *Primary Examiner.*

S. CLEMENT SWISHER, *Assistant Examiner.*